Figure 6:
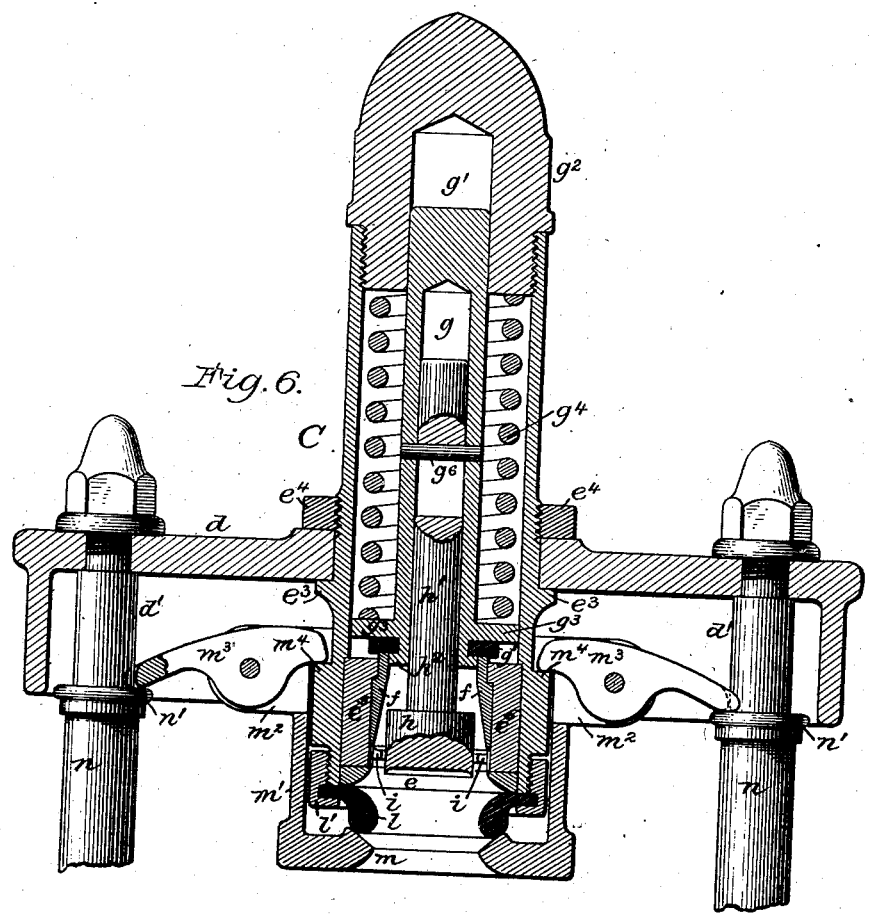

(No Model.) 8 Sheets—Sheet 1.
W. PAINTER.
METHOD OF AND MEANS FOR BOTTLING LIQUIDS AND SEALING BOTTLES.
No. 473,776. Patented Apr. 26, 1892.
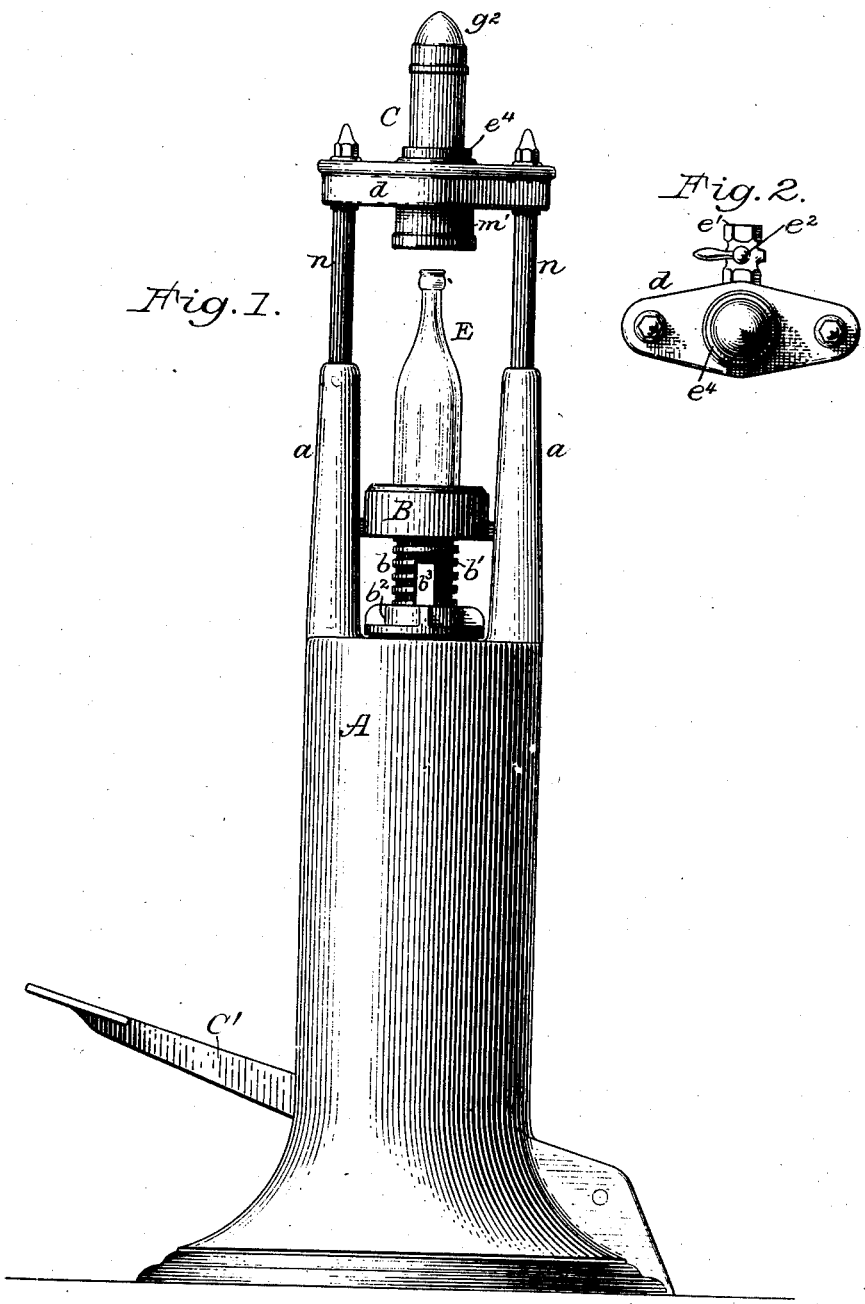
Attest:
Philip F. Larner
Howell Ball
Inventor:
William Painter
By [attorney]

(No Model.) 8 Sheets—Sheet 2.
W. PAINTER.
METHOD OF AND MEANS FOR BOTTLING LIQUIDS AND SEALING BOTTLES.
No. 473,776. Patented Apr. 26, 1892.
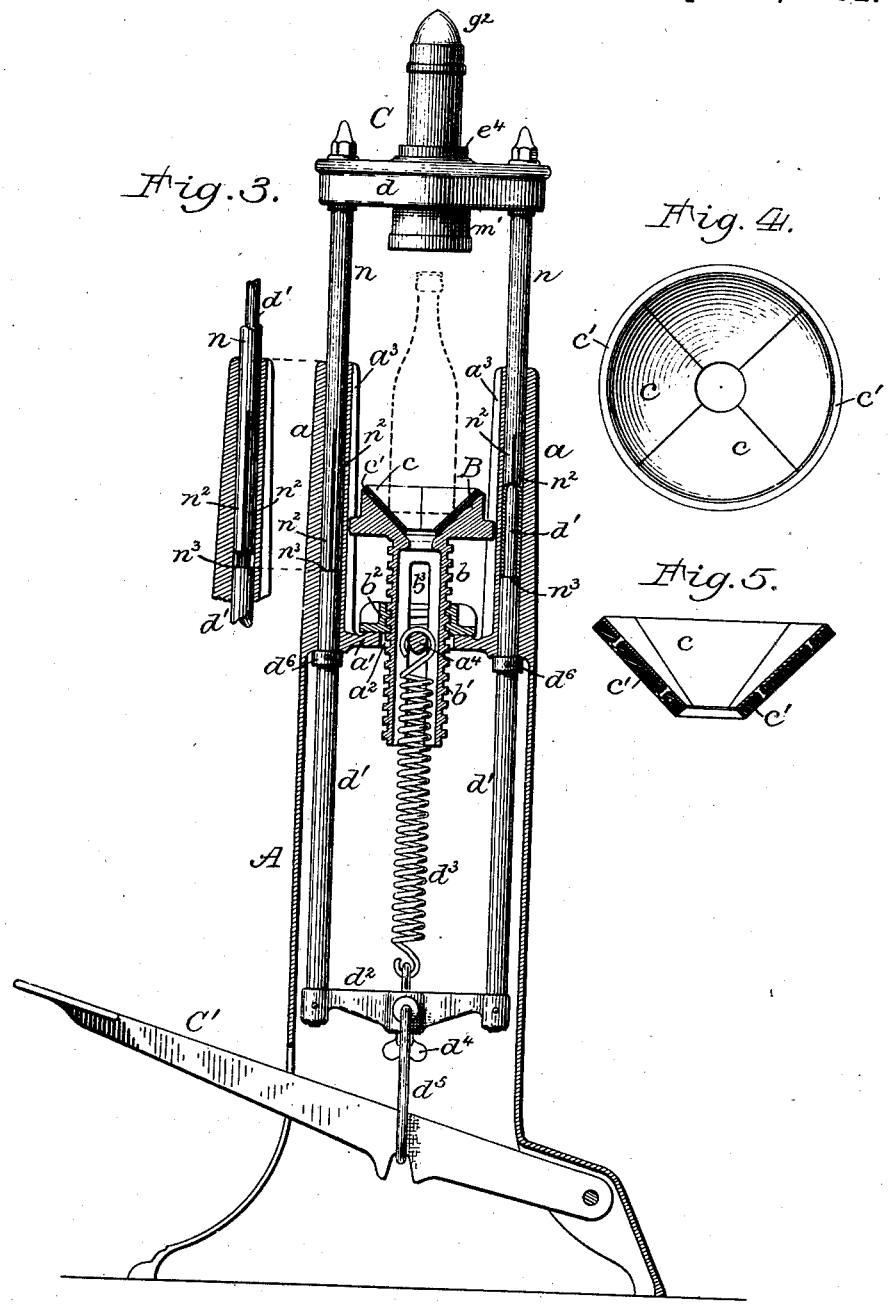

(No Model.) 8 Sheets—Sheet 3.

W. PAINTER.
METHOD OF AND MEANS FOR BOTTLING LIQUIDS AND SEALING BOTTLES.

No. 473,776. Patented Apr. 26, 1892.

Attest:
Philip F. Larner
Nowell Bartlett

Inventor:
William Painter
By Wm C Mood
Attorney (No Model.) 8 Sheets—Sheet 4.
W. PAINTER.
METHOD OF AND MEANS FOR BOTTLING LIQUIDS AND SEALING BOTTLES.
No. 473,776. Patented Apr. 26, 1892.
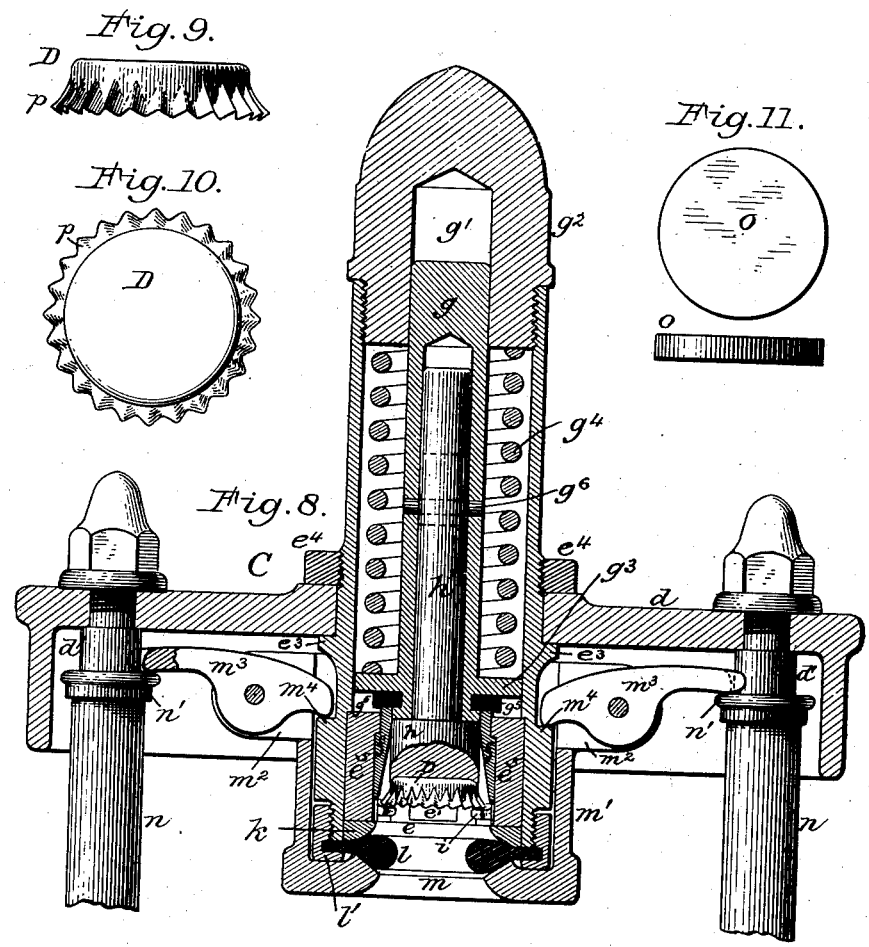
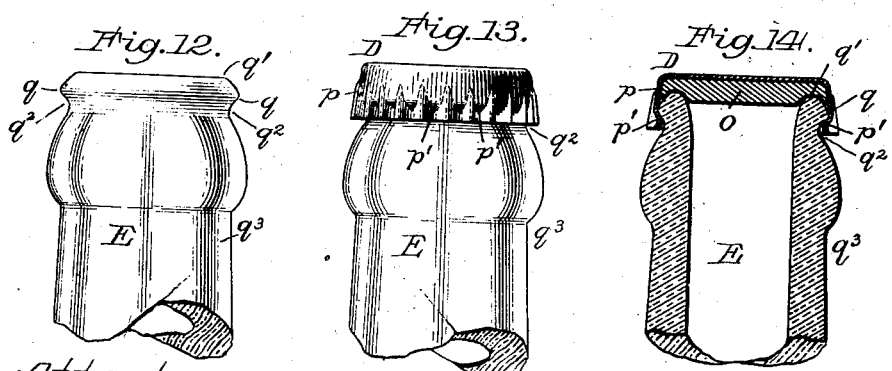
Attest:
Philip F. Larner
Howell Barth
Inventor:
William Painter
By [attorney signature]
Attorney (No Model.) 8 Sheets—Sheet 5.
W. PAINTER.
METHOD OF AND MEANS FOR BOTTLING LIQUIDS AND SEALING BOTTLES.
No. 473,776. Patented Apr. 26, 1892.
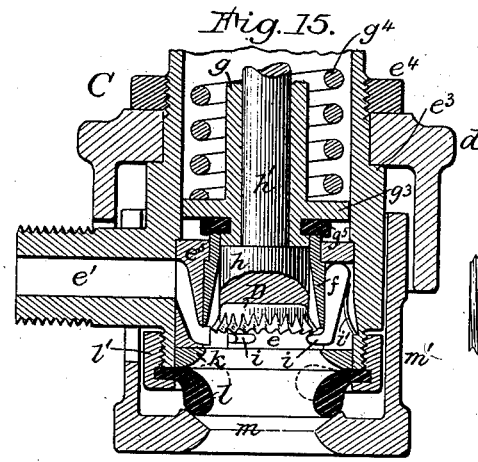
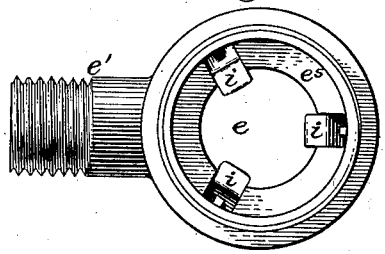
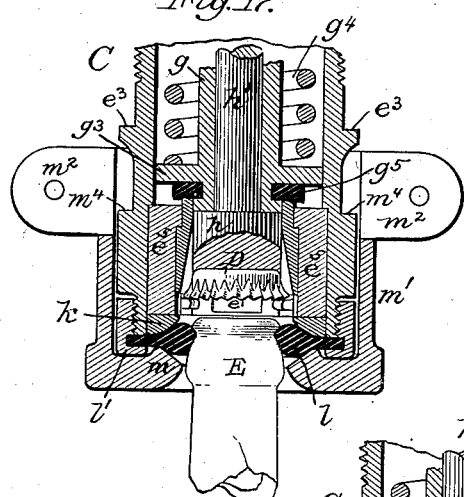
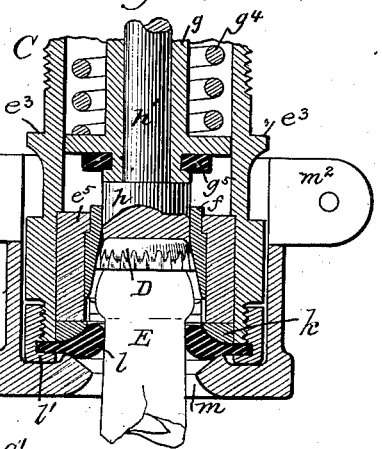
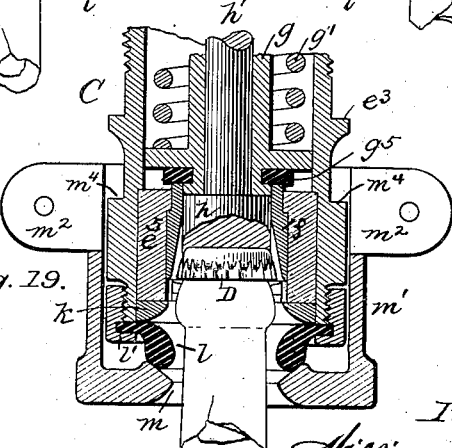
Attest:
Philip F. Larner
Howell Bartle
Inventor:
William Painter
By McB Mud
Attorney (No Model.) 8 Sheets—Sheet 6.
W. PAINTER.
METHOD OF AND MEANS FOR BOTTLING LIQUIDS AND SEALING BOTTLES.
No. 473,776. Patented Apr. 26, 1892.
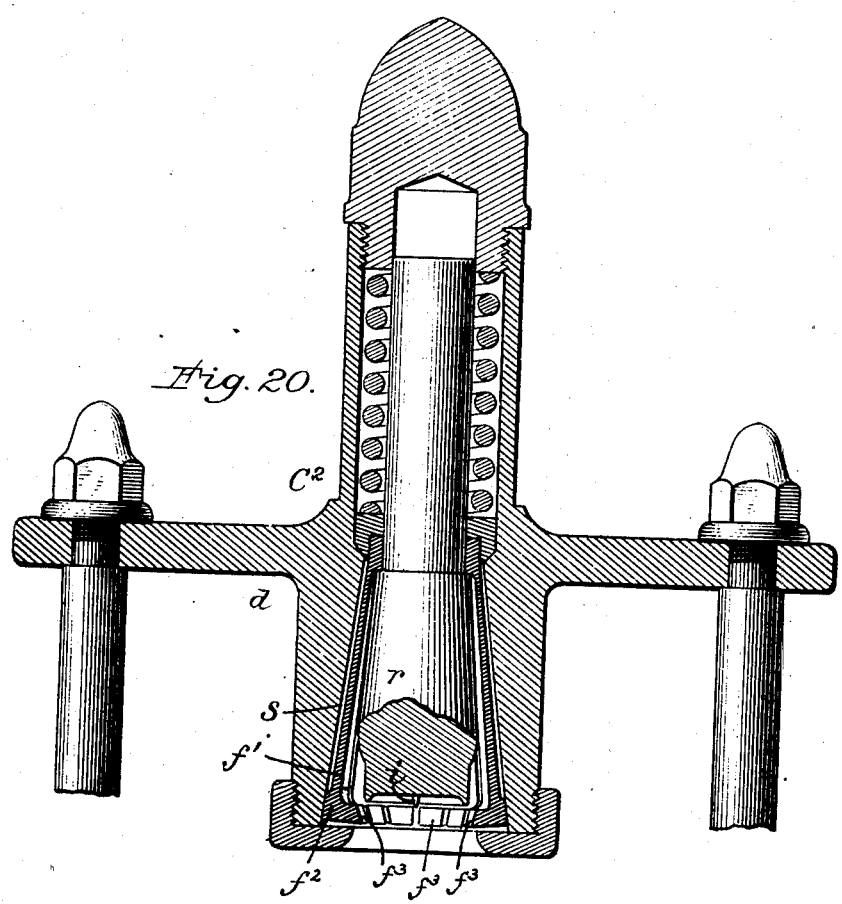
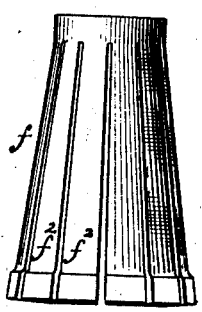
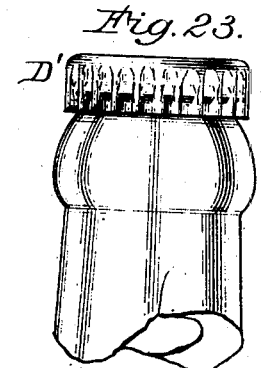
Attest:
Philip F. Larner
Howell Bartle
Inventor:
William Painter
By [attorney]

(No Model.) 8 Sheets—Sheet 7.
W. PAINTER.
METHOD OF AND MEANS FOR BOTTLING LIQUIDS AND SEALING BOTTLES.
No. 473,776. Patented Apr. 26, 1892.
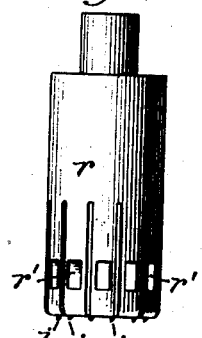
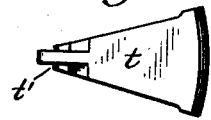
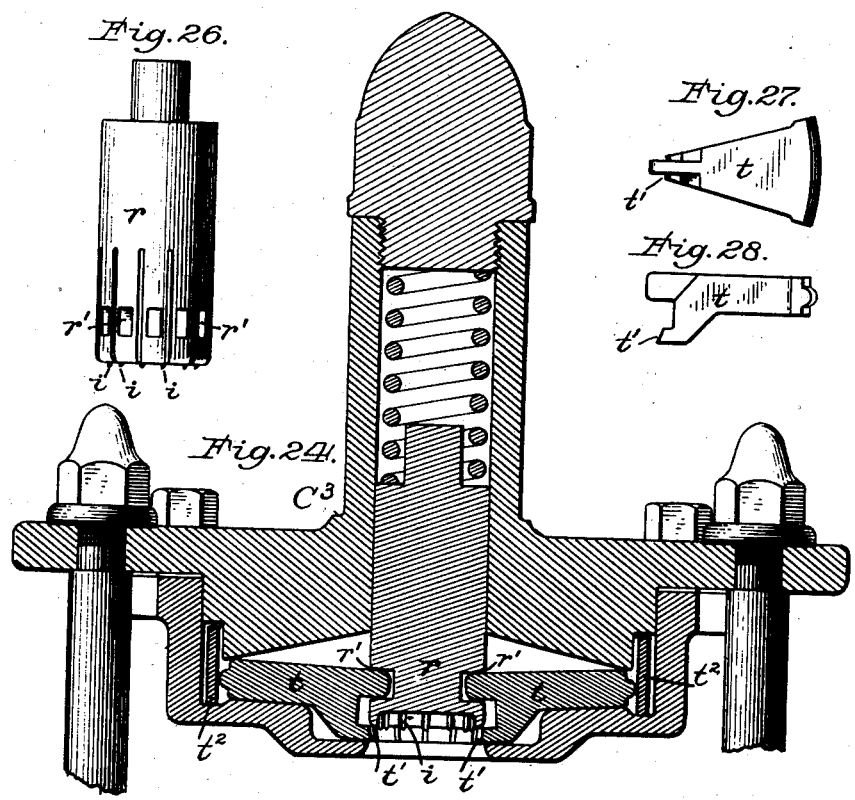
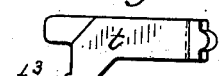
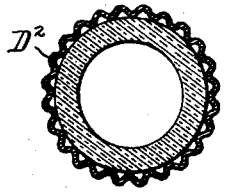
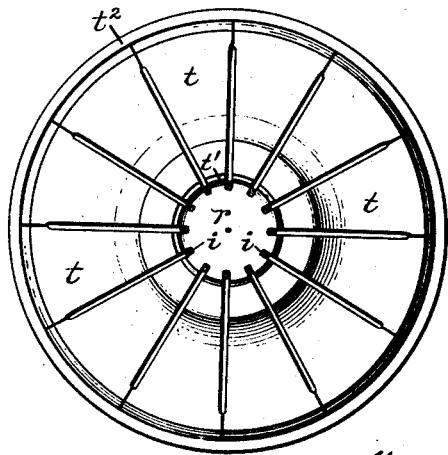
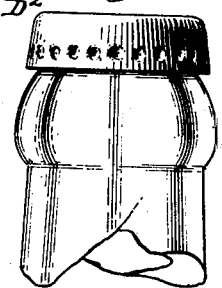
Attest:
Philip F. Larner
Nowell Battle
Inventor:
William Painter
By McNamara
Attorney

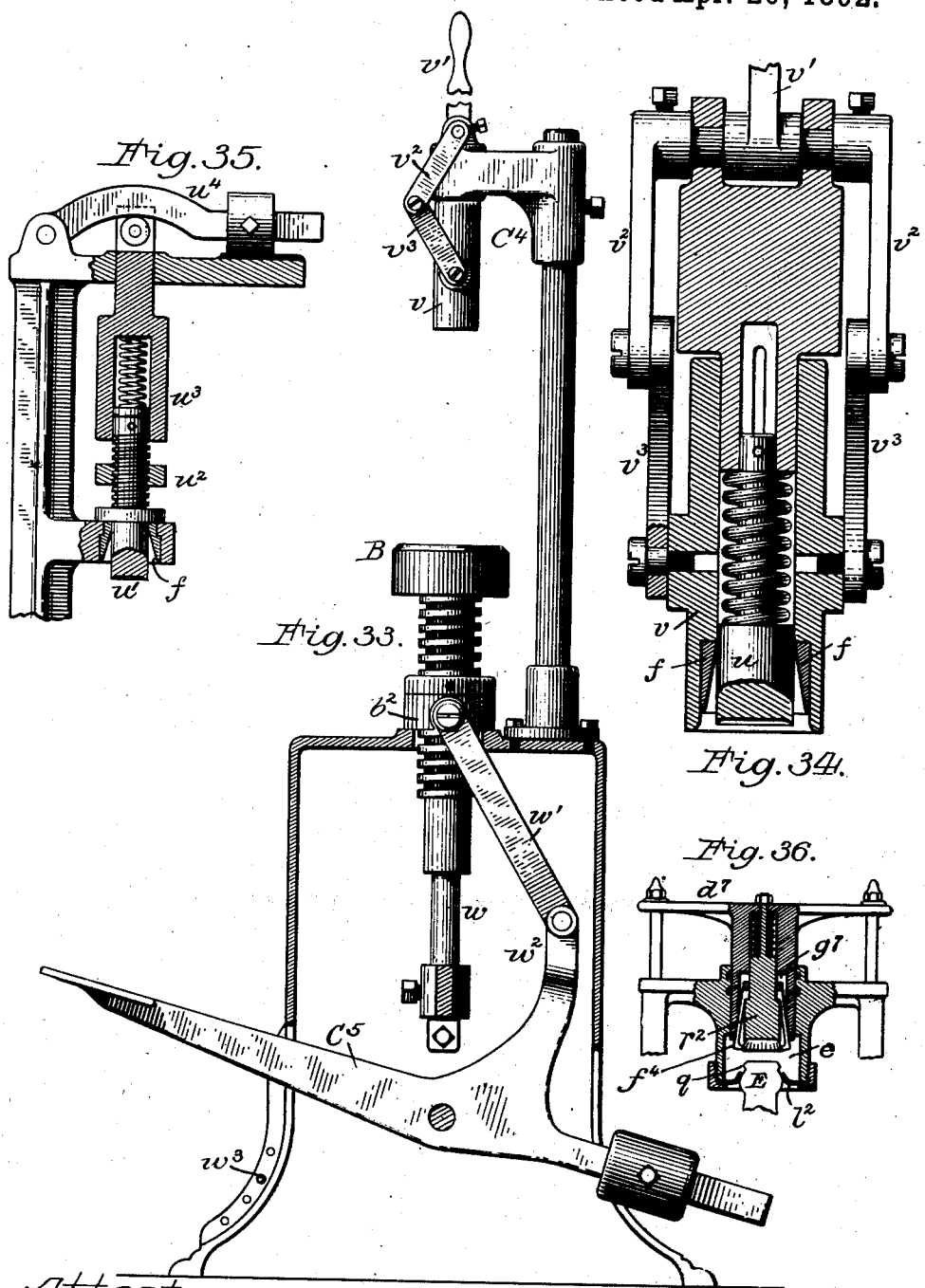

UNITED STATES PATENT OFFICE.

WILLIAM PAINTER, OF BALTIMORE, MARYLAND.

METHOD OF AND MEANS FOR BOTTLING LIQUIDS AND SEALING BOTTLES.

SPECIFICATION forming part of Letters Patent No. 473,776, dated April 26, 1892.

Application filed April 8, 1891. Serial No. 388,094. (No model.)

*To all whom it may concern:*

Be it known that I, WILLIAM PAINTER, of the city of Baltimore, in the State of Maryland, have invented a certain new and useful Method of and Means for Bottling Liquids and Sealing Bottles; and I do hereby declare that the following specification, taken in connection with the drawings furnished and forming a part of the same, is a clear, true, and complete description of the several features of my invention.

For indicating the status of my invention with reference to the prior art I will state that I employ bottles which have exterior locking-shoulders on the heads thereof and hard-metal flanged caps containing compressible sealing-disks, and I have for the first time in the art provided for the use of such caps and disks in the bottling of liquids under gaseous pressure, the mode of operation, broadly stated, being as follows, viz: inserting into and supporting within the filling-chamber of a bottling-machine a metal-flanged cap containing a compressible sealing-disk, inserting into said chamber, in line with said disk and cap, the head of a bottle provided with an annular locking-shoulder and forming a temporary packing-contact between the walls of the filling-chamber and the head of the bottle, charging or filling the bottle, forcing the cap, the disk, and the bottle together under heavy pressure and causing the lip of the bottle to be embedded in the sealing-disk, and then, while maintaining the disk thus compressed and with the flange of the cap projected upon the head of the bottle in exact conformity with the compression of the disk, bending and setting said flange beneath and into intimate and reliable contact with said locking-shoulder, and thereby securely confining the disk in its compressed condition upon and in proper sealing-contact with the lip of the bottle.

In order that the novelty involved may be fairly defined, I will state that it is believed to be radically new in the art of bottling to insert into a filling-chamber in a bottling-machine flanged metallic sealing-caps of any kind, whether separate from a bottle or loosely carried thereon, although it is not new to insert into a filling-chamber a bottle having a stopper hinged to its head and permanently carried thereon—for instance, as shown in German Letters Patent No. 31,193—and it is quite common to insert in an open-topped throat-piece corks and sealing-disks which enter and are seated within the mouths of bottles, and an instance of the latter-operation will be found in my United States Letters Patent No. 438,708, dated October 21, 1890. It is also believed to be new to insert a bottle-head into a filling-chamber in line with a previously-supplied flanged cap containing a sealing-disk, although, as before indicated, it is old to apply a bottle in line with a throat containing a cork or a sealing-disk inserted in the open top of said throat; but in these latter instances the sealing devices are located with reference to their entering the bottle-heads, and the same is true of the hinged stoppers of the German Patent No. 31,193, whereas in my operation the cap surrounds or incloses a portion of the bottle-head. In other words, said prior methods involve what may be termed "inside" operations with respect of the bottle-head, while in my method an outside operation is involved.

It is not new to form and maintain a temporary packing-contact either as between the neck or the head of a bottle and the lower end of an open-topped throat, that operation being essential in many prior bottling operations. I provide for a shifting packing-contact involving changes in the relative positions of the packing and the bottle-head, whereas in prior operations the bottle-neck or the head, having once been properly engaged with the packing, no changes in position need occur during the filling and corking operations. While it is believed to be new to provide for a shifting packing-contact with a bottle-head, and although I have devised means to that end, a non-shifting packing-contact can be relied upon when specially-heavy bottling-pressures are not involved, as will be hereinafter further explained. In prior operations clearance for a bottle-head having its wiring yokes or loops thereon must be provided for; but clearance for the stopper is only required in line with the entrance to the bottle, as for the passage of a cork or an inside sealing-disk; but in my operation clearance must be afforded for the flange of a sealing-cap not only in line with the outside circumference of the bottle-lip, but there must be a still greater lateral clearance to a degree more or less closely approximating to the height or length of the heads of bottles to be filled. As to the mere charging or filling of the bottle no novelty is involved. It is, however, believed to be radically new in bottle-filling to force a disk within a flanged cap upon and over the lip of a bottle within a filling-chamber in a bottling-machine and to project or advance the flange upon the head of a bottle to a degree exactly corresponding to that to which the sealing-disk may have been compressed while causing it to conform to the top edge or lip of the bottle, as well as with portions of the adjacent inner and outer sides thereof. It is also believed to be radically new to in any manner secure a flanged sealing-cap to the outside of a bottle-head while within the filling-chamber of a bottling-machine, whether the bottling operation involves gaseous pressures or not, and it is believed to be equally new within a filling-chamber to forcibly bend the flange of a metal sealing-cap into locking-contact with a specially-formed shoulder on a bottle-head while a sealing-disk within the cap is being forced under heavy pressure into conforming contact with the lip of the bottle, thus causing the cap to operate as a practically permanent sealing-clamp. It is, however, old in operating outside of and apart from bottling-machines to spin the flanges of soft-metal capsules into close-enveloping contact with the heads and necks of bottles, and such capsules have contained sealing-disks, presumably held under pressure during the spinning operation—for instance, as disclosed in German Letters Patent No. 28,719, of 1884, and British Letters Patent No. 13,062 of 1886. It is also old, as disclosed in British Letters Patent No. 11,003, of 1845, to secure the contents of bottles by the use of hollow metal caps or covers composed of stiff stubborn metal—such as tinned iron—and provided with teeth, which at their tips are bent under the head of the bottle; but said patent affords no indication that the cap was not to be used as a substitute for wire or cord with corks inserted in the ordinary way.

Many forms of sealing devices for use with disks have been disclosed in prior patents—as, for instance, such caps as are provided with spring-arms having latch-shaped ends, which, being in use with sealing-disks, would engage with the lower edge of a bottle-head as a spring-latch engages with its keeper, as described in British Letters Patent No. 2,967 of 1877, and also such as were disclosed in British Letters Patent No. 2,415 of 1875 and No. 13,672 of 1887, said caps having curved spring-arms intended by their power of contraction to draw or pull downwardly upon the lower rounded portion of the head of a bottle for holding a disk in contact with the lip of the bottle.

Figure 7:
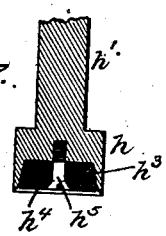

The character of sealing-caps employed in accordance with the hereinbefore-recited main feature of my invention may be quite widely varied in matters of detail as to materials, form, and structure; but for securing the best results they should be composed of hard metal, of which tinned-iron plate is a preferred type, and the cap must have a pendent flange adapted to be so bent peripherally that it may be firmly engaged without fracturing contact with a locking-shoulder on the head of a bottle. The flange of the cap must also be of such strength and capable of being so securely applied that it may in a practically permanent way maintain a sealing-disk under such compression as will enable it to resist the escape of gas and liquid from a bottle under whatever pressure may be desired—sometimes over one hundred pounds per square inch. I have devised corrugated hard-metal sealing-caps fulfilling the several requirements, and the same in various forms have been made the subject of my applications for patents filed November 5, 1889, and June 16, 1890. (See also application filed May 19, 1891.) The mechanism devised by me for use in the complex operation of bottle filling and sealing is believed to be the first in the art of bottling which renders it possible to apply sealing-caps containing disks to bottles charged under pressure and to maintain that pressure during the closing and sealing operations. It is also believed that certain portions of the mechanism devised by me constitute the first organizations in this art whereby a bottle may be sealed by a compressible sealing-disk forced upon and around the lip of the bottle or in enveloping contact therewith, and then while the disk is under heavy pressure enabling it to be securely clamped and held in its compressed condition by a flanged hard-metal cap forcibly bent into locking-contact with the bottle-head. The most effective operation of fastening corrugated hard-metal flanged caps to bottle-heads having locking-shoulders, whether in connection with or separate from the charging or filling operation, involves a novel method devised by me, which includes as one of the steps therein the bending or indenting of the metal at the inner corrugation into locking-contact with the shoulder on the bottle-head by applying pressure simultaneously to the several outer corrugations.
Referring to the eight sheets of drawings, Figure 1 illustrates one of my machines in side elevation and with a bottle in a position preparatory to filling and sealing. Fig. 2 is a top view of the head of the machine. Fig. 3 is in part in side view and in central vertical section of the lower portion of the machine with a detached illustration of the adjacent portion of the machine embraced between the dotted lines. Figs. 4 and 5 are respectively a top view and section of the bottle-supporting socket. Fig. 6 is a central vertical sectional view of the head of the machine on an enlarged scale. Fig. 7 is a sectional view of a cap-plunger in its best form. Fig. 8 is a sectional view like Fig. 6, but with some of the movable parts in different positions and with a sealing-cap inserted and maintained in position by certain engaging fingers. Figs. 9 and 10 in two views illustrate one of my sealing-caps of the most approved construction. Fig. 11 illustrates a sealing-disk in top and edge views. Fig. 12 in side view illustrates the head of a bottle in its most approved form for use with my caps. Fig. 13 illustrates a bottle-head with the cap, Fig. 9, applied thereto. Fig. 14 illustrates the same cap and bottle-head in vertical cross-section. Fig. 15 is a central vertical section of the central lower portion of the machine-head on a line at right angles to the sectional line of Figs. 6 and 8 and with a sealing-cap in position for application to a bottle. Fig. 16 is a bottom view of the main portion of the filling-chamber with an interior fixed sleeve and three fingers, which temporarily support the sealing-cap in proper relation to the plunger. Fig. 17 is a sectional view of the parts shown in Fig. 15, but on a line at right angles thereto, and with a sealing-cap in place, a bottle-head in position to receive a charge and tightly packed around its head below its locking-shoulder. Fig. 18 is a similar view illustrating the bottle and cap firmly united. Fig. 19 is a similar view illustrating the retirement of the packing-gasket from the sealed bottle, the latter being then freely removable. Fig. 20 is a sectional view of a machine-head containing mechanism particularly adapted to operate upon sealing-caps of another form. Fig. 21 in side view illustrates the main portion of the flange-bending tool of Fig. 20. Fig. 22 illustrates a sealing-cap upon which the said flange-bending tool is specially adapted to operate. Fig. 23 in side view illustrates a bottle-head with a cap like that shown in Fig. 22 applied thereto. Fig. 24 is a sectional view of another machine-head, illustrating a cap-flange-bending tool in still another form. Fig. 25 is a bottom view of said flange-bending tool, including an encircling ring and the sealing-cap seat at the lower end of a cap-plunger. Fig. 26 is a side view of this cap-plunger detached. Figs. 27 and 28 in top and side views illustrate one of the sections or parts of the cap-flange-bending tool. Fig. 29 illustrates in side view a modified form of cap-flange-bending tool specially adapted to operate upon plain flanged sealing-caps. Fig. 30 illustrates in side view a plain flanged sealing-cap. Figs. 31 and 32, respectively, in side view and in section illustrate a bottle-head with a plain flanged cap, Fig. 30, applied thereto as by the mechanism illustrated in Figs. 24 and 29. Fig. 33 in side elevation illustrates a type of machine specially adapted for sealing after the bottles have been in any manner filled and the caps placed thereon by hand. Fig. 34 illustrates the head of the said machine in section and on an enlarged scale. Fig. 35 illustrates a modification of the head of the machine, which enables the hand-lever of Figs. 33 and 34 to be dispensed with. Fig. 36 illustrates a modification of the machine-head with a filling-chamber and a flange-bending tool operating after the manner illustrated in Fig. 20.

I will first describe one of my machines in connection with Figs. 1 to 19, inclusive. The frame A of the machine is preferably composed of cast-iron, cylindrical in form, and it has a flaring base slotted vertically at one side for the reception of a treadle-lever, which is fulcrumed or pivoted in a suitable socket at the opposite side of the base. At the top of the frame A there are two vertical tubular columns $a$ $a$, and they not only serve as vertical guides, but their interior surfaces also afford a frictional contact for securing a proper operation of certain sleeves which slide therein, as will be more fully hereinafter explained. Within the frame, as shown in Fig. 3, there is a solid horizontal partition, which serves as a fixed bracket $a'$, having a central opening at $a^2$. In the vertical columns $a$ $a$ there are two vertical parallel grooves $a^3$ $a^3$, which serve as guides for a bottle-socket B, having projections at each side which freely occupy said grooves. The bottle-socket has a tubular stem $b$, having an external screw-thread $b'$ fitted to a similarly-threaded base-nut $b^2$, which rests upon the bracket $a'$, while the stem $b$ projects downwardly through the central opening $a^2$ in said bracket. The stem $b$ is slotted vertically, as at $b^3$, for the accommodation of a horizontal stud or bar $a^4$, which is rigidly fixed to or may be a part of the bracket $a'$. The particular means described for adjusting the bottle-support forms no material part of my invention and any suitable form of table and adjustment may be used. The bottle-socket B is internally conical, its sides being lined with thin smooth flexible metal plates $c$, secured in place and backed by elastic cushions $c'$, as clearly indicated in Figs. 4 and 5.

A bottle is shown in dotted lines in Fig. 3 with its bottom in proper position in the socket, and it will be seen that it can be readily and accurately centered in a vertical position, and supported evenly in line with the filling-chamber and sealing devices. When vertical pressure is applied to the bottle, the yielding capacity of the thin-cushioned plates enables a firm bearing to be secured, regardless of slight imperfections in the form of the bottle at its base, and the liability of breaking the bottle is reduced to a minimum. In this machine there is no movement of the bottle-socket during the sealing operation; but the socket must be adjusted for use with bottles of a given height, and it will be seen that this vertical adjusting capacity is afforded by the screw-threaded stem and the base-nut. When but little pressure is required upon the sealing-disks, it is not so essential that the bottle be so accurately centered as when extra heavy pressure is involved, and therefore in some cases the bottle-socket need not be conical, but a slightly-yielding cushion will always be desirable.

The head C of the machine is reciprocated vertically during the filling and sealing operation, and I will first describe the features of construction which pertain to this general operation. The working mechanism of the head is all carried by a cross-head $d$, which is rigidly secured to the tops of two sliding rods $d'$ $d'$, which occupy the tubular guides $a$ $a$ and extend downwardly into the frame and are coupled at their lower ends by a second cross-head $d^2$. The head C and these rods are supported in a normally-elevated position by means of a spiral spring $d^3$, connected at its lower end to the cross-head $d^2$ and at its upper end to the bracket $a'$ by means of the cross-bar $a^4$, within a slot in the tubular-stem $b$ of the bottle-socket. The sustaining-power of the spring is made adjustable by means of the thumb-screw $d^4$. The depression of the head C is effected by means of the treadle-lever C', which is coupled to the cross-head $d^2$ by a suitable link $d^5$, and the vertical movement of the head C is restricted by collars $d^6$ $d^6$ on the sliding supporting-rods $d'$ $d'$, said collars abutting against the bases of the tubular guides $a$ $a$.

This machine being adapted for filling bottles with or without gaseous pressure, the head of the machine contains a filling-chamber $e$, provided with an induction-pipe $e'$ and a suitable cock $e^2$, as shown in Figs. 2, 15, and 16. This chamber has a vertical tubular dome, having an external annular shoulder at $e^3$, above which it is externally screw-threaded for the reception of a clamping-nut $e^4$, thus providing for firmly mounting the chamber on the cross-head $d$, as clearly indicated in Fig. 6. The filling-chamber proper is reduced in diameter by a tightly-fitting stationary sleeve $e^5$, and within said sleeve there is a close-fitting stationary tubular internally-tapered sleeve $f$, which is composed of metal and performs the duty of a rigid bending-tool for forcibly bending the flange of a sealing-cap into locking-contact with a bottle-head. This annular bending-tool is in its simplest form known to me; but its construction may be widely varied without departure from certain portions of my invention.

In the dome of the filling-chamber there is a hollow piston $g$, guided at its top in a socket $g'$ inside of the screw-cap $g^2$ of the dome, and at its lower end it has a circular guide-flange $g^3$ loosely fitted to the interior annular surface of the dome. Between the cap $g^2$ and said flange $g^3$ there is a spiral spring $g^4$ under compression, which forces the piston $g$ downward and normally maintains it in heavy contact with a rubber gasket $g^5$, carried by the piston below the guide-flange $g^3$ and interposed between it and the annular top edge of the bending-tool $f$. It will be seen that when the piston $g$ is depressed no liquid can pass from the filling-chamber below said piston upward into the dome during the filling operation. Instead of this gasket, the piston may be provided with a suitable stuffing-box.

Within the filling-chamber there is a centrally-located cap-plunger $h$, having a stem $h'$ sliding freely within the hollow piston $g$; but it is loosely connected therewith by means of a lateral stud $g^6$, which freely occupies a slot in the stem $h'$ of the plunger. The face of the cap-plunger is concaved and conforms to the top surface of the sealing-cap, and it therefore serves to properly center the cap. The free dropping movement of the cap-plunger is restricted by said stud, and said plunger may be moved upwardly until the top of the plunger-head $h$ abuts against the coincident surface of the lower end of the piston $g$ at $h^2$, Fig. 6. The cap-plunger may have a solid head and be relied upon for good service when comparatively perfect seals and bottles are used; but in its best form the head $h$ is constructed as shown in Fig. 7. This head is chambered for the snug reception of a cushion $h^3$ of rubber, specially selected with reference to its compactness and desirable resiliency, and said cushion is faced with a thin flexible metal disk $h^4$, the two being secured to the plunger by a central screw $h^5$. This plunger enables a uniform or well-distributed pressure to be applied regardless of ordinary variations in the form of a bottle-lip, such as depressions therein or variations in sealing-disks in the matter of density and thickness. The gist of this feature of my invention consists, in part, in providing a plunger-head with a face which has a self-adjusting capacity, so that should a bottle be imperfectly centered at its base and its lip be correspondingly inclined the plunger-face will adapt itself thereto and compress the sealing-disk with uniformity, and hence this effect would be secured by a swiveling connection between the head or face portion of a plunger and its stem. The cushioned self-adjusting plunger-face has special value for securing a good packing-joint between an uneven bottle-lip and a specially thin and correspondingly economical disk.

Now referring to Figs. 6, 15, and 16, it will be seen that the stationary sleeve $e^5$ in the filling-chamber is vertically slotted to afford spaces for the reception of three cap-holding fingers $i$ $i$ $i$, the shanks of which extend upwardly between the bending-tool $f$ and the walls of the filling-chamber. The working tips of said fingers project inwardly beyond the lower edge of the bending-tool. The seats or slots at their lower ends are closed by a ring $k$, having its top flat and its lower and inner surface rounded. The tips of said fingers are normally projected by their back springs, each finger having a curved spring $i'$ secured to the back of its shank and having its free lower end bearing in a notch and against a coincident portion of the interior wall of the filling-chamber. With respect of a mere cap-holding function supporting-fingers are not a necessity, as I have used a magnetic cap-plunger with fairly satisfactory results. In all bottle-filling machines a packing-contact must be at times maintained between the head of the bottle and the adjacent portion of the passage through which liquid passes on its way to the bottle. As hereinbefore indicated, I employ a filling-chamber, and said chamber is closed, except as to an entrance for liquid, and as to an opening at its base for the complete reception of caps and bottle-heads, and the removal of sealed bottles. In this machine the packing-contact with the bottle-head is effected by novel means and involves a novel mode of operation, and the prime factor in this connection is an annular specially formed or molded packing-ring or funnel-shaped gasket $l$ of rubber, having a thick well-rounded pendent lip. This gasket is clamped to the lower end of the filling-chamber by means of a screw-threaded clamping-ring $l'$, which occupies an exterior screw-thread on a recessed portion of the wall of the chamber and permits the annular lip of the gasket to occupy its normal pendent position, as is clearly indicated in Figs. 6, 15, and 19. The gasket is mechanically controlled both with respect of securing or providing for its engagement with or by the head of a bottle, and also its release therefrom and by means which will now be described. Below the gasket $l$ there is a vertically-reciprocating gasket-controller in the form of a bevel-surfaced ring $m$, having a tubular sleeve $m'$, which freely encircles the lower end of the filling-chamber and is provided with two pairs of laterally-projecting lugs $m^2$. Between the lugs of each pair and pivoted thereto there is a lever $m^3$, and these levers at their inner ends bear upon shoulders $m^4$ on the outside of the filling-chamber $e$, and at their forked or concaved outer ends they bear upon the tops of collars $n'$ $n'$, secured to or parts of the tops of sleeves $n$ $n$, which surround the supporting-rods $d'$ $d'$. Referring now to Fig. 3 it will be seen that these sleeves $n$ $n$ are longitudinally slitted to afford outwardly-pressing springs $n^2$, which by contact with the interior surfaces of the guide-columns $a$ $a$ enables said sleeves to be frictionally controlled to the extent that they will remain stationary during a desired portion of the longitudinal movement of the rods $d'$ $d'$. At their lower or split ends these sleeves abut against annular shoulders $n^3$ on the rods $d'$ $d'$, thus preventing undue downward movement of the sleeves with respect to the rods, and also effecting their proper elevation after each depression of the head of the machine.

Referring now to Figs. 3, 6, and 8 it will be readily seen that when the treadle $C'$ is depressed the machine-head $C$ will descend, but that the gasket-controller will for a time stand still, (or, in one sense, be raised,) because of the lifting action of the levers $m^3$, induced by the temporarily stationary sleeves; but when the gasket-controller has been thus fully lifted the sleeves will then descend with the head $C$, the friction of said sleeves being overcome by the pressure on the treadle. It will be obvious that the gasket-controller can be directly connected with and controlled by the sleeves, and that arrangement has been used by me; but by introducing the levers the sleeves require less friction and the machine is therefore more easily operated. It will be seen that the gasket $l$ is normally funnel-shaped, and that when its lip is in a pendent position the maximum area of opening is afforded, so that a bottle-head may freely enter; also, that when the lip of the gasket is raised by the controller the area of opening is diminished, resulting in packing-contact with the bottle-head, the gasket then being flat and not funnel-shaped, and also that when the bottle is forced upward, after the filling operation has been completed, the shifting packing-contact is such that the gasket is made to assume an inverted-funnel shape, as is clearly indicated in Fig. 18.

The operation of the gasket-controller by means of a treadle is desirable; but if it were operated by hand, as by means of a screw-threaded rotative sleeve and a hand-lever, it would involve no departure from certain portions of my invention. When bottles are to be filled without pressure, the annular gasket, which packs against the bottle-head, need not be a molded gasket, as shown in the drawings, but may be a sheet of specially fine, strong, flexible, and elastic rubber, having a hole sufficiently smaller than the bottle-heads to enable the latter to be forced into and through the hole to any desired extent without impairing the packing-contact with the bottle-head, and yet enable the latter to be readily withdrawn after the sealing-cap has been applied. For general use, however, the molded gasket and its controller should be employed. If no cap be put into the filling-chamber, the bottle can be inserted and filled with liquid, then released, the sealing-cap applied by hand to the bottle, and then reinserted for compressing the seal and setting the cap; but this operation is of course impossible when gaseous pressures are involved.

A machine constructed and organized as thus far described may be employed for operating with sealing-caps somewhat varied in their character; but in matters of detail the working parts shown in immediate connection with the filling-chamber are particularly adapted to operate with my sealing-caps in their most approved form, as shown at D, Figs. 9 and 10, which involves certain specific and valuable features of novelty which were not disclosed in my aforesaid application for patent and which will be made the subject of a separate application. (See Serial No. 393,293, filed May 19, 1891.) The cap D is composed of tinned-iron plate and contains a suitable compressible sealing-disk $o$, Figs. 11 and 14, which is peripherally embraced by the flange of the cap. This flange $p$ is corrugated and flared or inclined outwardly quite abruptly at its edge, so that the latter on being bent downwardly will force the inner corrugations inwardly beneath the locking-shoulder on a bottle, as will be readily understood from an examination of Figs. 13 and 14.

The bottles adapted for use with my sealing-caps may be somewhat varied as to the form of the head and lip; but as shown in Figs. 12 and 14 the bottle E must be provided with a suitable locking-shoulder, as at $q$, properly located below the lip $q'$. Below said shoulder $q$ there is a recess $q^2$, and therefrom the head is gradually enlarged and then lessened to the diameter of the neck $q^3$. Corrugated flanged caps and bottles are best suited for use with each other when the locking-shoulder $q$ is located below the lip $q'$ at a distance substantially equal to the distance between the sealing-disk (when compressed) and the vertical center of the corrugations. If, however, any substantial portion of the inner corrugations be bent beneath the locking-shoulder the cap will be sufficiently well secured for ordinary bottling purposes. As shown in Figs. 13 and 14, the edge of the cap-flange is intentionally left projected beyond the adjacent surface of the bottle to facilitate the use of means for detaching the caps; but in some cases I employ bending-tools which can bend said edge inwardly at an angle and quite closely to the head of the bottle.

The practically simultaneous filling and sealing operation is performed as follows: As seen in Fig. 6, the machine-head C is at its highest position, as when at rest, the cap-plunger $h$ is downwardly-projected by its own weight into the filling-chamber $e$, the gasket-controlling ring is in its lowest position, and the gasket is open to allow the sealing-cap to be inserted into the filling-chamber. The plunger $h$ is now lifted, as shown in Fig. 15, by the operator in the act of inserting the cap D by hand with the top uppermost and against the working face of the plunger. In doing this the flange of the cap causes the fingers $i$ to retire until they can again be sufficiently extended beneath the edge of the cap-flange to properly support the cap with the weight of the plunger thereon, as shown in Fig. 15. The free dropping movement of the plunger below the fingers enables a cap to be readily centered in the concave face of the plunger, so that when the cap and plunger are moved upwardly the flange of the cap is maintained in a horizontal position, and therefore the supporting-fingers simultaneously retire and then engage with the edge of the cap-flange. A bottle is placed upright in the bottle-socket B, as shown in dotted lines in Fig. 3. The treadle C' is then depressed for moving the machine-head C downwardly, which promptly causes the gasket-controller $m$ to lift the annular lip of the gasket $l$ from the pendent position indicated in Fig. 6 to the horizontal position shown in Fig. 8 and also in dotted lines in Fig. 15, thus materially reducing the diameter of the central opening in the gasket. A further depression of the machine-head C forces the contracted gasket $l$ downward and over or upon the head of the bottle, as shown in Fig. 17, the gasket being thereby radially expanded to some extent and made to closely conform to the surface of the bottle-head, thus forming a gas and water tight packing between the head of the bottle below the recess $q^2$ and the adjacent annular wall of the filling-chamber $e$. The ring $k$ serves as an abutment for the raised portion of the gasket and not only insures its proper conformation with or to the bottle-head, but also exerts a pinching action of the gasket between the ring and the bottle-head, so that the gas-pressure in the filling-chamber cannot displace the gasket. The bottle is then filled, liquid and gas entering by way of the cock $e^2$, Fig. 2, pipe or port $e'$, Fig. 15, passing in between the sealing-cap and the top of the bottle. The requisite occasional discharge of gas or air known as "snifting" may be provided for in various ways—as for instance, by the use of a special snifting duct and valve in connection with the filling-chamber in a manner corresponding to their use, with a throat-piece, as disclosed in my Letters Patent No. 438,708. Although the cap-plunger stem slides freely within the piston-rod, there is no tendency for liquid to pass upwardly around said stem, as there is no communication between the interior of the piston and the dome. When the bottle has been properly charged, the cock is closed and the machine-head further depressed. The gasket $l$ then yields, being tightly squeezed against the ring $k$, and passing downward upon the head of the bottle, bearing, meanwhile, with good contact against it. In the meantime the bottle-head will have been surmounted by the cap and the disk will have been forced heavily upon the bottle-lip by the plunger, causing it to thoroughly embrace said lip, as shown in Fig. 14. Until the sealing-disk is in solid contact with the lip of the bottle and the bottle has been thus practically sealed, the gasket still maintains a tight and perfect joint around the bottle-head, while sliding freely thereon. Further downward movement of the machine-head during the locking of the cap on the bottle causes the gasket to slip down below the bottle-head upon the neck $q^3$, as shown in Fig. 18. The descent of the cap-plunger and spring-piston $g$ is arrested by the bottle as soon as the plunger has partially compressed the sealing-disk, the piston and plunger then being under the compressing action of the spring, which increases as the machine-head descends. During this pressure upon the top of the bottle its bottom readily centers itself in the socket B, as before indicated, because of the conical surface thereof, and said surface being also smooth and metallic the glass freely slips thereon in seeking a central general bearing. The rubber cushion $e'$ below the metal plates $c$ affords desirable yielding effects, which are conducive to the centering operation, as well as obviating liability of breakage and providing for properly centering bottles which may be imperfect in form at their bases and also for bottles of various sizes. While the cap and the disk are thus maintained on the bottle under the heavy pressure exerted by the spring, (sometimes from two hundred to three hundred pounds,) the further descent of the machine-head carries the bending-tool $f$ downwardly and its interior inclined working surface, by engaging with the periphery of the flange of the cap, forces the latter inwardly and causes the inner corrugations or those portions of the flange which are between the outer corrugations to be bent beneath the locking-shoulder into the recess $q^2$ and into firm locking-contact with said shoulder, the portions so bent being clearly indicated at $p'$ in Figs. 13 and 14. As the machine-head descends, the fingers $i$ move downwardly from the edge of the cap-flange, and although the fingers remain in their inwardly-projected position they do not re-engage with the cap-flange when the machine-head is subsequently raised, because their rounded ends freely slip over the edge of the cap-flange after it has been reduced in diameter and locked to the bottle. The filling and sealing operations being thus completed, the treadle is released, whereupon the machine-head C ascends, and at the beginning of its upward movement the gasket $l$ is promptly freed from its controller by reason of the friction-sleeves remaining stationary during the said initial upward movement of the machine-head. Its packing-lip is then allowed to assume its normal distended form, as shown in Fig. 19, permitting the machine-head to rise freely from the filled and sealed bottle, whereupon the cap-plunger $h$ will drop into its normal position, as shown in Fig. 6, and be ready for the reception of another sealing-cap.

The accurate position of the machine-head with respect to the bottle-top preparatory to filling, as shown in Fig. 17, is easily determined, because while pressing the treadle and as the machine-head descends the operator can readily feel the abrupt arresting action of the contracted gasket after the latter has passed over the locking-shoulder on the bottle and engages with the head below the recess, as shown in Fig. 17, because the gasket-controller will always be fully operated and the gasket-opening contracted, as shown in Fig. 8, before the lip of the gasket reaches the top of the bottle, regardless of the height of the latter. It will thus be seen that by the action of the friction-sleeves upon the gasket-controller the initial downward movement of the machine-head closes the gasket so as to make a joint with the bottle-head as soon as it comes in contact with it, and that the initial upward movement of the machine-head causes the gasket to open and release the sealed bottle, these operations occurring in proper sequence and at proper times without regard to the heights of bottles or the extent of movement of the machine-head.

In operating with such a sealing-cap as is shown in Fig. 22 a flange-bending tool is desirable which can positively engage laterally with the flange. This cap D′ has corrugations which extend substantially from the lower edge of the flange to the top of the cap, and it is at or near the middle portions of the interior corrugations that they are bent into locking-contact with the annular shoulder of the bottle, as illustrated in Fig. 23. The exact point, however, is immaterial and depends partly upon the thickness of the disk and partly upon the strength of the plunger-spring.

In the machine-head $C^2$ of Fig. 20 the filling-chamber is omitted, that not being absolutely necessary in all machines, as when liquids are not to be bottled under pressure. The cap-plunger $r$ in this machine is not materially unlike the cap-plunger $h$ before described, and it in like manner is backed by a heavy spring. The cross-head $d$ is provided with an internally-tapered socket $s$, and within this, between its wall and the plunger, is the annular flange-bending tool $f'$. This bending-tool is in the form a hollow truncated cone mounted on and carried by the cap-plunger, and it is slotted to afford spring-arms $f^2$, having at the inner sides of their lower ends suitable working faces $f^3$, which are in this case shown inclined rearwardly from their lower edges to their tops. With the working faces thus inclined the lower portion or edge of the flange below the locking-shoulder on the bottle-head may be bent inwardly at an angle and into close locking-contact with said shoulder; but when the faces are adapted for setting a cap precisely as in Fig. 23 they should be and are vertical instead of inclined, as shown, and they are also preferably of greater height. In applying a cap of this form with the corrugations extending practically throughout the depth of the flange the locking action is the result of a squeezing rather than a bending of the flange, the lateral pressure of the tool causing the locking-shoulder to embed itself in the corrugations, as shown. Considerable pressure is required in applying a cap of this and similar forms where the locking-rib must embed itself in the corrugations to a greater or less extent; but there is no danger of crushing the bottle-head, even if it is not perfectly round and the bending-tool be rigid, because the corrugations of the cap-flange are interposed between the bending-tool and the bottle-head, and as these corrugations are comparatively yielding they act in a manner as cushions between the rigid bending-tool and the bottle-head, and thus prevent hard contact and consequent breakage. Spring-fingers—only one at $i$ here shown—operate as before described, except that they do not project beneath the edge of the cap, but merely occupy corrugations and diametrically pinch hard enough to sustain the cap in place.

These fingers are also located opposite two adjacent spaces between the bending-faces $f^3$, and therefore when said fingers occupy spaces between the corrugations of a cap none of the corrugations can register with said spaces between the bending faces, but they will always be opposite said faces, while the spaces between said working faces will register with the spaces between the outward corrugations. With a sealing-cap in the custody of the plunger and a bottle supported upon a bottle-socket, as before described, it will be seen that when the head $C^2$ is depressed the cap and seal will be properly applied to the bottle-head and powerful pressure exerted on the disk, and that as the machine-head descends the faces of the bending-tool will be forced inwardly by the action of the tapered socket $s$, and thereby bend the interior corrugations of the cap-flange into conforming contact with the annular shoulder of a bottle, as described.

In some cases, as with specially heavy caps, it is desirable to apply the bending-pressure by means of a bending-tool, involving vibrating working faces, operating with powerful leverage, as illustrated in Figs. 24 to 28, inclusive. In this machine-head $C^3$ the cap-plunger $r$ has a series of cap-holding fingers $i$. (Fully shown in Fig. 26.) The plunger is recessed at intervals, as at $r'$, for the reception of the inner ends of a radially-arranged series of segmental-shaped levers $t$, said levers being also so shaped as to afford working faces $t'$. At their outer ends these levers are rounded vertically to afford good bearing-contact with a ring $t^3$, which surrounds the levers and maintains them in proper relation to the plunger. This ring $t^2$ is preferably of steel, and is strong but flexible, and it is loosely seated, so that the working faces of the annular bending-tool may operate equally well in locking a cap on a bottle having an imperfectly-rounded head, as on one which has a truly circular head or locking-shoulder. This feature of change of form to any desirable extent may be given to any form of bending or locking tools, whereby an even pressure may be brought on different parts of a bottle-head not truly circular. The hollow tapering bending-tool, Fig. 6, may be made in sections and held together by a strong flexible ring. The tapering socket, Fig. 20, may also be similarly made flexible, as will be readily understood, the same principle applying as shown in Fig. 24. The plunger and these levers, with their working faces, constitute an efficient annular flange-bending tool, which, like the other forms, encircles the sealing-cap, and it will be seen that its operation will follow the vertical retirement of the plunger, incident to the arresting of the plunger, in contact with the top of a bottle. Sealing-caps which have initially-corrugated flanges afford the best results, and the method herein indicated of applying such caps to bottles having an engaging shoulder constitutes a valuable feature of my invention, the gist thereof consisting in causing the inner corrugations to be bent or indented into locking-contact with the engaging shoulder by applying pressure to the outer corrugations.

For applying a plain flanged cap $D^2$—such as is shown in Fig. 30—to a bottle, as illustrated in Figs. 31 and 32, it is only necessary to provide the faces $t'$ of the levers $t$ with suitable indenting-points, one form of which is illustrated at $t^3$, Fig. 29.

It will be understood that, although the machine-heads of Figs. 20 and 24 are here shown without a filling-chamber, the latter may be added and operated as in the machine first described. It will be seen that the cap-holding fingers of Figs. 20 and 24 in engaging with a corrugated flange-cap will secure the latter against rotation, and therefore an internally-screw-threaded flanged cap having a sealing-disk and external serrations may be similarly supported above the threaded head of a bottle. The bottle, while applied to the filling-chamber, as heretofore described, may therefore be charged under pressure and then advanced to the cap and bodily rotated, (or the plunger may be rotated with similar effect,) and thus made to secure a sealing union with the cap and disk while the contents of the bottle are under gaseous pressure, this being an operation which, as is believed, was never before accomplished.

With a filling-chamber it is obviously important for securing the best results that the sealing-cap should be supported above the top of a bottle, so as to afford ample space beneath the cap for the prompt and free entrance of liquid to the bottle. Bottles may, however, be slowly filled when caps—for instance, like that shown in Fig. 22—are first loosely placed thereon, then inserted into the filling-chamber, and the gasket closed around the bottle-head below the cap, because the corrugations in the flange afford between the flange and bottle-head numerous channels or passages for liquid to enter the bottle. In this case the cap must be of such size internally as not to go onto the bottle-head far enough for the sealing-disk to close the bottle-mouth.

In bottling some kinds of liquids—such as non-gaseous mineral waters, sirups, sauces, &c.—it may sometimes be desirable to fill the bottles and place the caps thereon by hand preparatory to the sealing operation by a machine. In Figs. 33 and 34 I show a machine well adapted for use in the lines just indicated, in some of which it may be desirable to first insert corks in the bottles in the ordinary way and to use the sealing-caps as mere cork-holding devices, and in other cases the use of corks, sealing-disks, and caps may be desirable for obtaining more positive security. In this machine the head $C^4$, Fig. 33, is adjustably mounted upon a standard and it is not vertically reciprocated, as in the machines before described, although it is obvious that the machine-heads, Figs. 20 and 24, need not be reciprocated in order to secure good operative results, the sealing action being as well effected by lifting the bottle with sufficient force. The cap-plunger $u$ of machine, Fig. 33, differs from those previously described, in that no cap-supporting fingers are employed therewith. The bending-tool $f$ is like that first described; but in this case it is carried by a sleeve $v$, capable of vertical reciprocation by means of a hand-lever $v'$ (which is shown as if broken away centrally) and toggle-links $v^2\ v^3$, said lever being normally in a vertical position and keyed to a rock-shaft, to which the links $v^2$ are also keyed. The operator on pulling the lever $v'$ downward and toward the front of the machine imparts the proper movement to the bending-tool. The bottle-socket B is as before described; but in this instance it is vertically reciprocated, its threaded stem being hollow and sliding upon a rigid vertical guide-rod $w$. The nut $b^2$ is surmounted by a clamp-nut, so that the vertical adjustment of the socket in the nut $b^2$ may be securely maintained. This nut $b^2$ also serves as a cross-head, to which a pair of links $w'$ (one only here shown) are pivoted at their upper ends, their lower ends being similarly pivoted to the vertical forked arm $w^2$ of the weighted treadle-lever $C^5$.

It will be seen when a bottle with a cap mounted thereon is placed upon or in the socket and the treadle-lever depressed that the loosely-capped bottle will be lifted and the top of the cap forced against the cap-plunger, which on gradually retiring will increase its compressing action, according to the height at which the bottle may be lifted. The depression of the treadle may be adjustably limited by a stop-pin $w^3$, occupying appropriate holes in a pair of flanges at the sides of the slot in which the treadle moves. While the bottle with the seal thus compressed is in this position the hand-lever $v'$ is operated for bending the flange and completing the sealing operation. It will be seen that in this type of machine the cap-plunger need not be backed by a spring, or, in other words, it need not yield to the upward pressure applied by way of the treadle and bottle-socket, because as soon as sufficient pressure has been applied the bending-tool can be forced downwardly or operated in other ways, causing it to bend the flange of the cap into locking-contact with the bottle-head.

It is sometimes desirable to dispense with a hand-lever, and to that end, in part, I organize the head of the machine as shown in Fig. 35. In this instance the bending-tool $f$ is of the same form as that previously described; but it is in this case immovable and occupies a bracket projecting from the upright portion of the frame of the machine. The cap-plunger $u'$, like the others described, is centrally located with relation to the bending-tool, and it has a stem which is externally screw-threaded, and it carries a nut $u^2$; but it slides in a hollow spindle $n^3$ and is heavily backed by a spring. The spindle at its upper end has a guide-bearing in the overhanging portion of the frame, and at its top it is slotted and provided with a friction-roller for supporting an adjustably-weighted lever $u^4$. The head of the plunger projects normally considerably below the bending-tool $f$, so that when the bottle with a cap thereon is forced upwardly against the plunger the latter may retire until its spring exerts almost the required pressure just before the bending-tool begins to operate, and then the nut $u^3$ strikes against the end of the spindle. The spring then ceases to yield and the weighted lever is lifted, and therefore during the flange-bending operation the pressure on the disk will be absolutely uniform. It will be obvious, in view of the slight range of movement involved in the operation of the cross-heads of the other types of machines, that this mode of obviating variation in pressure upon the disk during the flange-bending operation may be applied to those machines, if desired. The hollow tapered bending-tool $f$, whether it be forced downwardly upon a cap and bottle or held stationary while the cap and bottle are forced into it, frictionally engages with the flange to such an extent as to force the cap upon the bottle, and therefore if the sealing-disk be specially compressible it will be sufficiently well seated upon the bottle-lip to serve a good purpose in such bottling as involves little or no gaseous pressure, and hence the said bending-tool, in combination with a bottle-support and means for forcing the bottle and the bending-tool into working relations with reference to an interposed cap, constitutes a valuable portion of my invention.

It is not to be understood that the gasket in my filling-machines must of necessity be arranged to slip wholly over the head of a bottle—as, for instance, when the cap and the flange-setting devices are moved downward upon the head after the latter has been engaged in packing-contact by the gasket. In Fig. 36 I show a simple form of neck-gasket $l^3$, in proper relation to the head of a bottle E, at such a distance below the locking-shoulder $q$ as will afford ample space above the gasket, in which the bending-tool may operate after the sealing-cap has been forced upon the bottle. In this organization the filling-chamber $e$ is stationary, and the bottle is also fixed in position after the packing-contact with its head has been secured. The cap-plunger $r^2$ is similar to that shown in Fig. 20, in that it carries a similar bending-tool $f^4$; but in this case the cross-head $d^7$ is reciprocated and its downward movement causes the cap-plunger to deliver the sealing-cap upon the bottle, and then the disk is compressed through the operation of the plunger-spring, and simultaneously with the arresting of the downward movement of the plunger the annular inclined surface of the hollow piston $g^7$ completes the bending of the cap-flange into locking-contact with the bottle-head.

In the development of my invention I have devised and applied to service various mechanisms, other than those herein described and illustrated; but it is believed that the disclosures now made by me will be ample for enabling persons skilled in this art to fully comprehend and to practically apply the various features of my invention.

Having thus described my invention, I claim as new and desire to secure by Letters Patent—

1. The method, substantially as hereinbefore described, of sealing bottles, which consists in surmounting a bottle-head having an annular locking-shoulder with a corrugated flanged metal sealing-cap, and then bending or indenting the inner corrugations into locking-contact with the engaging-shoulder on the bottle-head by applying pressure simultaneously to the several outer corrugations.

2. In a bottling-machine, the combination, substantially as hereinbefore described, of a filling-chamber having sufficient interior capacity for receiving the heads of bottles to be filled, an annular gasket having a central opening for the reception of bottle-heads, and means within said chamber for bending the flanges of metallic sealing-caps into locking-contact with bottle-heads.

3. In a bottling-machine, the combination, substantially as hereinbefore described, of the following mechanism: a filling-chamber communicating with a source of supply and provided with an opening for the reception of a bottle-head and with a gasket for maintaining a closure of the space between the bottle-head and the adjacent walls of the chamber, a plunger having its head within the chamber, means for supporting within said chamber a flanged metal sealing-cap containing a sealing-disk and having its flange in a pendent position, means for forcing the bottle, the cap, and the disk into close relations, thereby causing the disk to conform to the lip of the bottle, and means for bending the flange of the cap beneath and in close locking-contact with a suitable locking-shoulder on the head of the bottle.

4. In a bottling-machine, a filling-chamber closed except as to the induction of liquids and to the complete reception of the head of a bottle and provided with an annular funnel-shaped gasket or packing having a pendent lip and normally adapted to receive a bottle-head and by the inward rolling action of the lip to maintain a shifting packing-contact with different portions of the head of a bottle during the filling and sealing operation.

5. In a bottle-filling machine, the combination, substantially as hereinbefore described, of a filling-chamber closed except as to a suitable induction-aperture for liquids and an opening for the complete reception of a bottle-head, an annular funnel-shaped gasket or packing-ring in said opening, and means for varying its interior annular dimensions and causing it to maintain packing-contact with the bottle-head, and then to release said head for withdrawal after the sealing-cap has been applied.

6. In a bottling-machine, the combination, substantially as hereinbefore described, of a filling-chamber having an annular gasket adapted to maintain shifting packing-contact with different portions of the head of a bottle when inserted into said chamber, and means for bending the flange of a sealing-cap upon the head of a bottle within the filling-chamber.

7. In a bottling-machine, the combination, substantially as hereinbefore described, of a bottle-filling chamber, an annular gasket or packing-ring at its lower open side, a gasket-controller for varying the area of opening in the annular gasket, vertically-sliding rods, frictionally-controlled sleeves capable of resting during the descent of said rods for operating the gasket-controller and also capable of moving with said rods, a cross-head on said rods for carrying the filling-chamber and other operative parts, and a spring for supporting and a treadle for depressing the same.

8. In a bottle-sealing machine, the combination, substantially as hereinbefore described, of an annular bending-tool adapted to encircle and to bend the flange of a sealing-cap into locking-contact with a bottle-head, a cap-plunger centrally located with relation to the bending-tool, and means for supporting the sealing-cap with its flange in a pendent position in line with the bending-tool and below said plunger.

9. In a bottling-machine, the combination, substantially as hereinbefore described, of a filling-chamber provided with a tubular dome, a hollow piston having a stem projecting into said dome and having a flange serving as a movable base for a spring, a sealing-cap plunger having its head in the filling-chamber proper and its stem loosely fitted in and connected with said piston, and an annular gasket compressed beneath the flange of the piston for packing the joint around the head of the cap-plunger and preventing the passage of liquid from the filling-chamber upwardly into the dome.

10. In a bottling-machine, the combination, substantially as hereinbefore described, of a filling-chamber adapted to receive a bottle-head, a packing-gasket for engaging with a bottle-head well below its lip and a hollow tapering bending-tool within said chamber, a support for a bottle, and means for forcing the bottle-support and bending-tool into working relations with respect of a metallic cap surmounting a bottle-head within the filling-chamber.

11. In a bottle-sealing machine, the combination, substantially as hereinbefore described, of a plunger adapted to bear upon the top of a sealing-cap, a bottle-socket for supporting a bottle in line with said plunger, an annular non-rotative bending-tool concentric with said plunger and having hard unyielding pressure-surfaces and adapted to bend portions of the flange of a hard-metal sealing-cap into locking-contact with a bottle-head, and means for forcing the cap, the interior sealing medium, and the bottle into close relations, and also for operating the bending-tool.

12. In a machine for applying flanged metal sealing-caps to bottles, the combination, substantially as hereinbefore described, of a hollow internally-tapered and rigid flange-bending tool, a support for a bottle, and means, substantially as described, for forcing said support and bending-tool into working relations with respect of an interposed bottle surmounted by a cap, and thereby bending the flange of the cap into locking-contact with the head of the bottle.

13. In a bottle-sealing machine, the combination, substantially as hereinbefore described, of a hollow tapering cap-flange-bending tool, a cap-plunger, and cap-supporting fingers for maintaining a sealing-cap with its flange in a pendent position during its reception of a bottle-head and in proper relation to the bending-tool preparatory to operation by the latter in bending the flange of the cap into locking-contact with the bottle-head.

14. In a bottle-sealing machine, the combination, substantially as hereinbefore described, of a hollow tapered bending-tool adapted to bend the flange of a sealing-cap into locking-contact with a bottle-head, a cap-plunger in line with said bending-tool, a bottle-support in line with said bending-tool and cap-plunger, and means for forcing the bottle and the cap-plunger into compressing-contact and thereby extending the flange of the cap upon the head of the bottle, and also means for varying the relative positions of the tapered bending-tool and the flange of the cap, and thereby bending the flange inwardly into locking-contact with the head of the bottle.

15. In a machine for bending flanged sealing-caps into locking-contact with the heads of bottles, the combination, substantially as hereinbefore described, of a bottle-socket, a longitudinally-movable cap-plunger having a concave face, an annular flange-bending tool concentric to said plunger, and means for forcing the cap-plunger and the head of a bottle into close relations with an interposed sealing-cap, said concave face on the plunger serving to center the cap and the bottle with relation to the bending-tool.

16. In a bottle-sealing machine, a conical bottle-socket having a bottle-bearing surface composed of a series of thin metal plates, in combination with an elastic cushion interposed between said plates and the body of the socket, substantially as described.

17. In a machine for applying metal sealing-caps to bottles, the combination, substantially as hereinbefore described, of a bottle-support and a cap-plunger provided with a self-adjusting metallic face adapted to bear upon and to distribute pressure evenly upon the top of the cap.

18. In a bottle-sealing machine adapted to operate upon flanged sealing-caps, a cap-compressing plunger having a concaved or recessed face and containing back of said face an inclosed elastic cushion, substantially as described.

WILLIAM PAINTER.

Witnesses:
T. R. ALEXANDER,
ORRIN C. PAINTER.